Dec. 23, 1952   E. L. McINTYRE   2,622,419
FLEXIBLE SPROCKET HUB
Filed May 21, 1949

Inventor:
Elmer L. McIntyre

Patented Dec. 23, 1952

2,622,419

UNITED STATES PATENT OFFICE 2,622,419

FLEXIBLE SPROCKET HUB

Elmer L. McIntyre, Detroit, Mich., assignor to Morse Chain Company, Ithaca, N. Y., a corporation of New York Application May 21, 1949, Serial No. 94,680

1 Claim. (Cl. 64—27)

This invention relates in general to sprockets for power transmission means and is particularly concerned with a flexible sprocket hub construction providing a means of connecting the sprocket to a shaft through a flexible medium particularly characterized as being of the series spring type.

A flexible sprocket hub construction incorporating a flexible medium as contemplated by this invention is particularly advantageous because it reduces the magnitude of shock load transmitted from the driving member to the driven member. In accordance with the construction of the present invention the drive is so constructed that the flexibility of the connecting flexible medium can be controlled by the respective arrangement and the number of flexible trunnion blocks incorporated in the device so as to tune the natural frequency of the system out of the range of the frequency of exciting torque.

It is recognized that in the prior art numerous attempts have been made to provide a flexible sprocket hub of this general class and efforts have been made to overcome the various deficiencies found in such prior art structures, but to the best of the applicant's knowledge the prior art structures have had only limited success, and have been accorded only limited commercial recognition. It is believed that this fact results from apparent deficiencies of the prior art structures, their nonadaptability for universal application and their expensive construction which so greatly increased the cost as to seriously handicap sales acceptance.

The present improvement in flexible sprocket hubs is directed to simplify their construction and their mode of operation and also to provide a flexible sprocket hub which may readily and conveniently be employed universally to various types of sprocket assemblies presently being commercially exploited. Moreover, the present device seeks to employ conventional parts wherever necessary and expedient, thereby to effect a substantial reduction in cost over prevailing types of flexible sprocket hub assemblies presently being employed.

Accordingly, an object and accomplishment of the invention is to provide a flexible sprocket hub assembly comprising a sprocket and flanged hub, the sprocket being arranged for a free fit on the flange hub and being maintained endwise by suitable means such as, for example, a snap ring. Operatively disposed between the sprocket and the flanged hub, in a series spring relationship, there is disposed a number of trunnion blocks having a like number of driving pins alternatively arranged so that one pin is associated with the sprocket while the next pin would be associated with the flanged hub. The load on the sprocket being through the pin by the trunnion block and thereafter to the driven shaft via the hub. An increase in absorption of the shock load by the trunnion blocks is accomplished by having a greater portion of at least one side in spaced relation to the sprocket or the hub to allow for volumetric expansion of said block.

A further object and accomplishment of the invention is to provide a flexible sprocket hub assembly designed for advantageous employment in power transmission equipment and which shall have a novel and compact arrangement of parts wherein said parts can be readily assembled and serviced.

The invention seeks, as a further object and accomplishment, to provide a flexible sprocket hub as contemplated herein and characterized by an arrangement of parts to more advantageously and satisfactorily perform the function required of it and adapted to provide a compact unit which will successfully combine the factors of structural simplicity and durability, and yet be economical to manufacture.

An important object and accomplishment of the invention is to provide a flexible sprocket hub incorporating a flexible medium, said flexible sprocket hub being particularly and advantageously applicable for employment in power transmission equipment where freedom from vibration and shock is desired, said flexible sprocket hub being particularly characterized in its simple but sturdy construction and in its convenient, fool-proof and safe operation.

A more detailed object and accomplishment of the invention is to provide a flexible sprocket hub assembly incorporating a flexible medium employing principles of construction and operation whereby the flexible medium imparts a series spring system as distinguished from a parallel spring system. It is notable that in series spring systems of the type as contemplated herein the deflection of the trunnion members are additive. This type of system gives less load carrying capacity than the parallel type system but provides more flexibility which may be highly desirable in many applications.

Another particular object and accomplishment of the invention is to provide a flexible sprocket hub incorporating a flexible medium by co-relating and especially designing the various elements of such sprocket hub assembly whereby there shall be cooperation between said improved elements as will best serve the purpose of providing an efficient flexible sprocket hub assembly capable of being manufactured at low cost and yet giving the maximum of service in use.

Additional objects, features and advantages of the invention disclosed herein will be apparent to persons skilled in the art after the construction and operation are understood from the within description.

It is preferred to accomplish the various objects of the invention and to practice the same in substantially the manner as hereinafter more fully described, and, as more particularly pointed out in the appended claim.

With the above and other incidental objects in view, the invention has other marked improvements and superiorities which radically distinguishes it from presently known structures, these improvements in the invention residing in the novel construction and cooperative function of the parts thereof, the combination of parts and the arrangement thereof as illustrated in the drawing and which will be more fully described hereinafter and particularly pointed out in the claim.

In the accompanying drawing on which there are shown preferred embodiments of the invention, Fig. 1 is a side elevational view of a flexible sprocket hub embodying the features of the present invention;

The drawing is to be understood as being more or less of a schematic character for the purpose of illustrating and disclosing typical or preferred forms of the improvements contemplated herein and in the drawing like reference characters identify the same parts in the several views.

Figure 2:
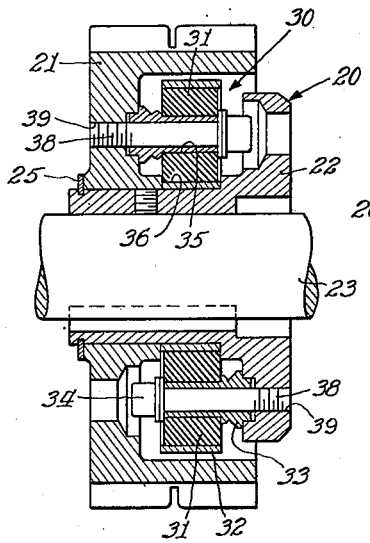
Fig. 2 is a sectional view of the flexible sprocket hub assembly depicted in Fig. 1 and being taken substantially on the plane on the line 2—2 in Fig. 1.
Figure 1:
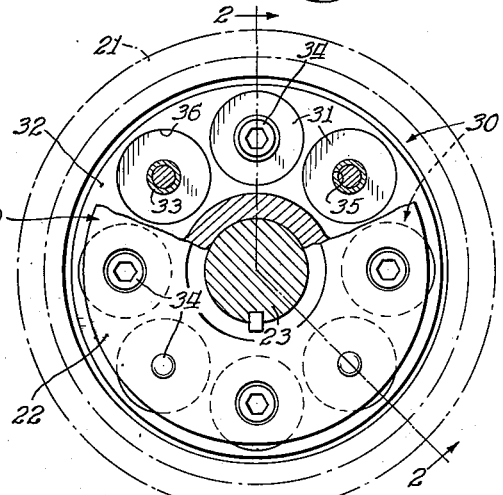

In the exemplary embodiment of the invention depicted in Figs. 1 and 2, the flexible sprocket hub with which the present invention is particularly concerned is designated in its entirety by the numeral 20 and comprises, in general, a sprocket element 21 in this instance constituting the driving member, a flanged hub 22 carried by a shaft 23 in this instance constituting the driven member, said sprocket element being arranged for a free fit on the flanged hub to permit restricted relative rotation therebetween and being maintained end-wise by suitable means such as, for example, a snap ring 25, said sprocket element 21 and said flanged hub 22 having operatively disposed therebetween a flexible medium designated in its entirety by the numeral 30 and comprising a plurality of trunnion blocks as at 31 operatively disposed within a retainer ring 32 carried for a free fit by portions of the hub 22 and being maintained end-wise by portions of the sprocket element 21, each of said trunnion blocks 31 being respectively operatively associated with a bushing as at 33 arranged in a series spring relationship, and a plurality of stud bolts 34 each respectively arranged to be received into portions of a bushing and so that one stud bolt would be associated with the sprocket while the next stud bolt would be associated with the flanged hub.

The foregoing arrangement is particularly characterized in its mode of operation in that the flexibility of the flexible medium can be controlled by the arrangement and number of the trunnion blocks as at 31 so as to tune the natural frequency of the system out of the range of the frequencies of the exciting torque.

It is notable that the path of the load on the sprocket is arranged so that it is taken through the stud bolt 34 by the trunnion block 31 and thereafter is transmitted to the driven shaft 23 via the hub flange 22. This arrangement provides torsional deflection or wrap-up of the sprocket 21 in relation to the shaft 23. The desired results can be also regulated by altering the number and size of trunnion blocks or the radius on which they are mounted.

In accordance with the construction of the present invention the flexible medium 30 imparts a series spring system as distinguished from a parallel spring system. In this connection, in series spring systems of the type as contemplated herein, the deflections of the trunnion members 31 of the flexible medium 30 are additive. This type of system gives less load carrying capacity but provides more flexibility than the parallel type system which may be highly desirable in many applications.

Having thus described in general the major component parts of the flexible sprocket hub contemplated herein, the specific construction and cooperative association and function of the parts of said flexible sprocket hub will now be described in detail.

Although the description has thus far stated that the sprocket element 21 constitutes the driving element while the shaft 23 constitutes the driven element, it is obvious that the function of these elements may be reversed in some instances so that the shaft 23 may be the driving element while sprocket element 21 will then become the driving member.

An important feature of this invention is the provision of the flexible medium 30 as being mechanically operatively disposed between the sprocket element 21 and the flanged hub 22 in a series relationship to provide a resilient connection between these elements. The flexible medium is comprised of preloaded trunnion blocks as at 31 which may be formed of a suitable rubber and whose live muscle-like flexibility takes up the wrap-up of torsional loads, thereby to protect machine installation to which the present flexible sprocket hub assembly may be adjunctively employed from shock, vibrations and uneven impulses. Moreover, the employment of flexible trunnion blocks as contemplated herein advantageously limits metal-to-metal contact between the driving and driven members and requires no lubrication, is impervious to dirt, dust and weather.

The muscle-like trunnion blocks as at 31 are designed for uniform stress and linear deflection, all relative movement being accommodated by controlled displacement of the compressed rubber. It is notable that the bore 35 of the trunnion block 31 is of smaller diameter than the outside diameter of the bushing 33, thereby providing a heavy press fit between these elements when they are assembled.

Furthermore, individual trunnion blocks as at 31 are press fitted into a pocket 36 disposed in the retainer ring 32. Each of the bushings 33 are arranged respectively to receive a stud bolt as at 34, said stud bolts having threaded end portions 38 adapted to be received into threaded apertures 39 in a series spring relationship, that is to say, one stud bolt would be associated with the sprocket while the next stud bolt would be associated with the flanged hub, this arrangement being illustrated in Fig. 2; therefore, when flexible medium 30 is in its assembled relationship as illustrated in Fig. 2, the trunnion blocks 31 are arranged for uniform stress and annular deflection, all relative movement being accommodated by controlled displacement of the compressed rubber. It is important to understand that preloading of the trunnion blocks 31 in assembly permits them to allow considerable deflection even with a light load. Another important feature is that the trunnion blocks 31 are disposed so that a greater portion of both sides thereof are in spaced relation with respect to the sprocket and hub thus increasing the absorption power of the blocks by allowing volumetric expansion thereof when subjected to shock loads.

Moreover, the design and preloading of the trunnion blocks provide advantageous operation in displacement resulting from thrust loads and accommodates annular deflection and torsional vibration, torsional deflection being overcome by the fact that imposition of a torque load increases pressure in the direction of the load and reduces pressure in the opposite direction. Attention is invited to the fact that because of the initial preloaded condition, the trunnion blocks are still under compression throughout their volume even at a miximum torque load.

The foregoing arrangement is particularly characterized in its mode of operation in that the flexibility of the flexible medium can be advantageously controlled by the proper arrangement and judicious selection as to the number of the trunnion blocks as at 31 so as to effectively tune the natural frequency of the system out of the range of the frequencies of the exciting torque.

Particular attention is invited to the arrangement disclosed in Fig. 2 wherein there is illustrated a flexible sprocket hub as contemplated herein which provides three basic parts, these parts being the hub structure 22, the flexible medium 30 and the sprocket element 21. It is important to understand that each of these parts are readily separable from the other. For example, the sprocket element can be conveniently and advantageously removed from portions of the hub by merely removing the snap ring 25 and removing the threaded end portion 38 of the stud 34 from the threaded aperture 39, thereby permitting the sprocket element to be moved axially to the left as shown in Fig. 2. In like manner the flexible medium may be advantageously and conveniently removed from the hub 22 by merely removing the remainder of the stud bolts which, incidentally, are related to the hub by having the threaded end formations 38 disposed in the threaded aperture 39, thereby permitting axial movement to the left as shown in Fig. 2 of the flexible medium 30 to remove the flexible medium from the hub.

Reassembly of the respective elements may be advantageously accomplished by merely reversing the aforementioned procedure, and in this connection it may be stated that various sizes of sprockets may be substituted, each of said sprockets having the general web structure to accommodate the hub in assembly.

Figure 4:
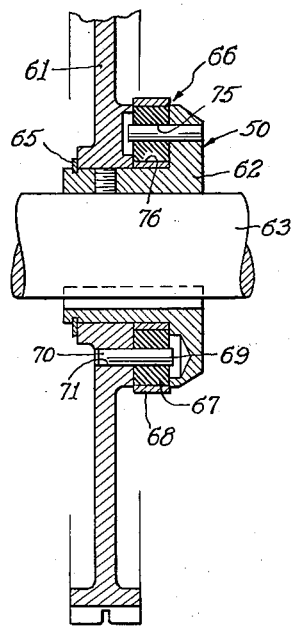
Fig. 4 is a sectional view of the flexible sprocket assembly depicted in Fig. 3 and being taken substantially on the plane of the line 4—4 in Fig. 3.
Figure 3:
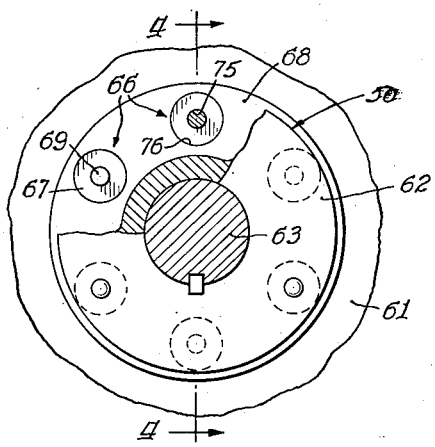
Fig. 3 is a side elevational view of a modified flexible sprocket hub assembly contemplated herein.

Attention is invited to Figs. 3 and 4 which disclose a modified flexible sprocket hub designated in its entirety by the numeral 50. The principles of operation are the same as that depicted with respect to the construction disclosed in Figs. 1 and 2, but in some applications it may be desirable to employ a pin construction, as disclosed in Fig. 4, as a substitute of the stud bolt construction as disclosed in Fig. 2.

In Fig. 4 the flexible sprocket hub assembly 50 comprises, in general, a sprocket element 61, a flanged hub 62 carried by a shaft 63, said sprocket element being arranged for a free fit on the flanged hub 62 to permit restricted relative rotation therebetween and being maintained endwise by suitable means such as, for example, a snap ring 65, said sprocket element 61 and said flanged hub 62 having operatively disposed therebetween a flexible medium designated in its entirety by the numeral 66 and comprising a plurality of trunnion blocks as at 67 operatively disposed within a retainer ring 68 which is carried for a free fit by portions of the hub 62 and being maintained endwise by portions of the sprocket element 61 and portions of the flanged hub 22, each of said trunnion blocks 67 being respectively operatively associated with a pin 69 having end portions 70 respectively arranged to be received into an aperature 71 in a series spring relationship so that one pin would be associated with the sprocket while the next pin would be associated with the flanged hub as illustrated.

The foregoing arrangement is particularly characterized in its mode of operation in that the flexibility of the flexible medium can be controlled by the arrangement and number of the trunnion blocks as at 31 so as to tune the natural frequency of the system out of the range of the frequencies of the exciting torque.

The muscle-like trunnion blocks 67 are designed for uniform stress and linear deflection, all relative movement being accommodated by controlled displacement of the compressed rubber. It is notable that the bore 75 of the trunnion block 31 is of smaller diameter than the diameter of the pin 69, thereby providing a heavy press fit between these elements when they are assembled.

Moreover, individual trunnion blocks 67 are press fitted into a pocket 76 disposed in the retainer ring 68 while the end portions 70 of the pins are received into the apertures 71 which are alternately disposed in the sprocket 61 and the flanged hub 62, thereby to provide a series spring relationship. A snug fit is provided for the end portions 70 of the pin 69 in the apertures 71.

In operation, it is notable that the sprocket 61 may be conveniently and advantageously removed from the hub assembly 62 by merely removing the snap ring 26 which will permit the sprocket 61 to be moved axially to the left as illustrated in Fig. 4. Thereafter, if it is so desired, the flexible medium 66 may be removed by merely sliding it axially to the left until it is removed from the hub.

In this connection, it may be stated that various sizes of sprockets may be employed on the same hub structure. Replacement of a selected sprocket may be accomplished in the manner as hereinbefore described. This feature is particularly advantageous where it is desired to employ different sized sprockets to accomplish different drive arrangements.

It is notable that the structure disclosed in Figs. 3 and 4 provides the same advantages of the preloaded trunnion blocks hereinbefore described with respect to the structure disclosed in Figs. 1 and 2. The trunnion blocks 62 have a side portion associated with the end portions of the pins in alternatively contiguous relation with respect to sprocket and the flanged hub 62 and a greater portion of another side associated with the opposite end of said pin in alternative spaced relation with respect to the flanged hub and sprocket thereby allowing volumetric expansion of said trunnion blocks thus reducing the magnitude of the shock loads transmitted from the sprocket to the hub.

From the foregoing disclosure, it may be observed that I have provided an improved flexible sprocket hub assembly which efficiently fulfills the objects thereof as hereinbefore set forth and which provides numerous advantages which may be summarized as follows:

1. Structurally simple, efficient and durable;
2. Economical to manufacture and readily adaptable to mass production manufacturing principles; and
3. The provision of a flexible sprocket hub particularly and advantageously applicable for employment in power transmission equipment where freedom from vibration and shock is desired, the arrangement thereof being particularly characterized in employing a series spring principle of operation.

While I have illustrated preferred embodiments of my invention, many modifications may be made without departing from the spirit of the invention, and I do not wish to be limited to the precise details of construction set forth, but wish to avail myself of all changes within the scope of the appended claim.

I claim:

A flexible sprocket hub assembly comprising a sprocket element constituting the driving member, a flanged hub carried by a shaft constituting the driven member, said sprocket element being arranged for a free fit on the flanged hub to permit restricted relative rotation therebetween, means associated with and carried by the flanged hub to maintain the sprocket element in its operative position with respect to the flanged hub, said sprocket element and said flanged hub having operatively disposed therebetween a flexible medium comprising a retainer ring and a plurality of trunnion blocks press-fitted therein, said retainer ring being arranged for a free fit on the hub, and a plurality of driving pins having end portions thereof alternatively secured to the sprocket element and the flanged hub and the opposite ends of said pins being fitted within the trunnion blocks, thereby to reduce the magnitude of shock loads transmitted from the driving to the driven member.

ELMER L. McINTYRE.

REFERENCES CITED

The following references are of record in the file of this patent:

UNITED STATES PATENTS

| Number | Name | Date |
|---|---|---|
| 1,815,894 | Baker | July 28, 1931 |
| 1,861,390 | Gunn | May 31, 1932 |
| 1,978,939 | Guy | Oct. 30, 1934 |
| 2,038,020 | Wylie | Apr. 21, 1936 |

FOREIGN PATENTS

| Number | Country | Date |
|---|---|---|
| 171,295 | Great Britain | Nov. 17, 1921 |